United States Patent
Montalvo et al.

(10) Patent No.: US 9,232,565 B2
(45) Date of Patent: Jan. 5, 2016

(54) MULTI-CARRIER BASE STATION RECEIVER

(71) Applicants: Antonio Montalvo, Raleigh, NC (US); Kevin G. Gard, Raleigh, NC (US)

(72) Inventors: Antonio Montalvo, Raleigh, NC (US); Kevin G. Gard, Raleigh, NC (US)

(73) Assignee: ANALOG DEVICES, INC., Norwood, MA (US)

( * ) Notice: Subject to any disclaimer, the term of this patent is extended or adjusted under 35 U.S.C. 154(b) by 70 days.

(21) Appl. No.: 13/967,159

(22) Filed: Aug. 14, 2013

(65) Prior Publication Data
US 2015/0049666 A1 Feb. 19, 2015

(51) Int. Cl.
*H04W 88/10* (2009.01)
*H04B 1/00* (2006.01)

(52) U.S. Cl.
CPC ............. *H04W 88/10* (2013.01); *H04B 1/0021* (2013.01)

(58) Field of Classification Search
None
See application file for complete search history.

(56) References Cited

U.S. PATENT DOCUMENTS

| | | | |
|---|---|---|---|
| 7,424,066 B2 | 9/2008 | Montalvo et al. | |
| 2002/0058491 A1* | 5/2002 | Minnis et al. | 455/323 |
| 2005/0197090 A1* | 9/2005 | Stockstad et al. | 455/313 |
| 2006/0165196 A1* | 7/2006 | Montalvo et al. | 375/322 |
| 2011/0316062 A1* | 12/2011 | Kondo et al. | 257/312 |
| 2012/0313672 A1* | 12/2012 | Andersson et al. | 327/116 |

* cited by examiner

*Primary Examiner* — Hassan Phillips
*Assistant Examiner* — Gautam Sharma
(74) *Attorney, Agent, or Firm* — Kenyon & Kenyon LLP

(57) ABSTRACT

Embodiments of the present invention may provide a receiver. The receiver may include an RF section and a quadrature mixture, coupled to the RF section, to downconvert a first group of wireless signals directly to baseband frequency quadrature signals and to downconvert a second group of wireless signals to intermediate frequency quadrature signals. The receiver may also include a pair of analog-to-digital converters (ADCs) to convert the downconverted quadrature signals to corresponding digital quadrature signals. Further, the receiver may include a digital section having two paths to perform signal processing on the digital baseband frequency quadrature signals and to downconvert the digital intermediate frequency signals to baseband cancelling a third order harmonic distortion therein. The receiver may be provided on a monolithically integrated circuit.

20 Claims, 4 Drawing Sheets

100

200

300

400 of the wireless communication system and may provide communication between the mobile stations 120-140 and the backend network. Of course, the wireless communication system 100 may include a plurality of base stations arranged in cells, and only one base station 110 is shown in FIG. 1 for simplicity and illustration purposes.
MULTI-CARRIER BASE STATION RECEIVER

BACKGROUND

The present invention relates to wireless communication receivers, in particular to monolithically integrated receivers that are configurable for multi-carrier, multi-band operation.

Cellular technology is constantly evolving to support growing widespread wireless technology usage. Recently, popular wireless standardized technology has progressed from GSM (Global System for Mobile Communication) to WCDMA (Wideband Code Division Multiple Access) to LTE (Long Term Evolution). However, when a new wireless standard emerges, the previous standard version does not become obsolete because devices supporting the previous standard are still in use. In fact, two or more prior standard generation devices are typically still in circulation. Thus, wireless communication providers desire to support all standard generation devices that are in circulation concurrently.

In recent years, base station receivers capable of receiving multiple carriers with a single signal path have become commonplace. The advantage of these multi-carrier receivers is lower cost and smaller size as compared to a system made with receivers dedicated to each carrier.

Because different standards provide different signal characteristics, network equipment such as base station receivers have to be complex enough to support the different signal characteristics. Direct conversion receivers are emerging for WCDMA and LTE standards. Direct conversion refers to downconverting directly from radio frequency (RF) to baseband. While direct conversion eliminates circuit components, which lowers receiver costs, direct conversion also has drawbacks such as sensitivity to finite image rejection and harmonic distortion. WCDMA and LTE standard signals lend themselves for direct conversion because of their relatively low image-rejection requirement (~70 dB). MC-GSM (Multi-Carrier GSM), on the other hand, has proved to be too difficult for direct conversion due to its large in-band blockers (−25 dBm in DCS/PCS bands and −16 dBM in GSM850/GSM900 bands) resulting in a ~90 dB image rejection and harmonic distortion rejection requirement which isn't practical with known techniques.

Consequently, MC-GSM typically employs heterodyne conversion using intermediate frequency (IF) sampling. These conventional MC-GSM heterodyne receivers generally are not amenable to monolithic integration. For instance, IF filters and anti-aliasing filters used in heterodyne receivers typically require large inductors that are not practicable for silicon fabrication. In contrast, WCDMA and LTE receivers can use direct conversion receivers. The inability to support MC-GSM with a direct-conversion receiver prevents the development of a single platform that can support all standards.

Therefore, the inventors recognized a need in the art for a base station receiver that supports different standard signals, such as MC-GSM and WCDMA/LTE, with a single monolithic receiver.

DETAILED DESCRIPTION

Embodiments of the present invention may provide a receiver. The receiver may include an RF section and a quadrature mixture, coupled to the RF section, to downconvert a first group of wireless signals directly to baseband frequency quadrature signals and to downconvert a second group of wireless signals to intermediate frequency quadrature signals. The receiver may also include a pair of analog-to-digital converters (ADCs) to convert the downconverted quadrature signals to corresponding digital quadrature signals. Further, the receiver may include a digital section having two paths to perform signal processing on the digital baseband frequency quadrature signals and to downconvert the digital intermediate frequency signals to baseband cancelling a third order harmonic distortion therein. The receiver may be provided on a monolithically integrated circuit.

Figure 1:
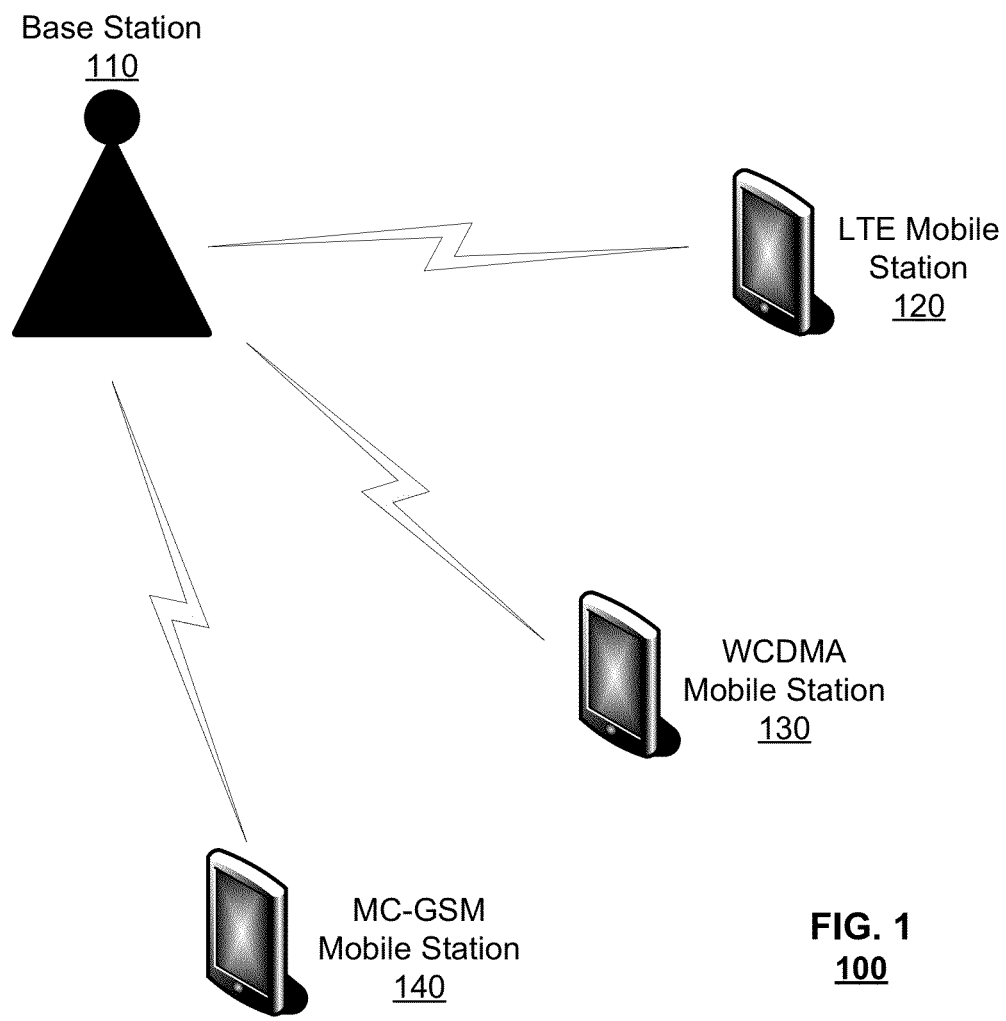
FIG. 1 illustrates a wireless communication system according to an embodiment of the present invention.

FIG. 1 illustrates a wireless communication system 100 according to an embodiment of the present invention. The wireless communication system 100 may include a base station 110 and a plurality of mobile stations 120-140. The base station 110 may be coupled to backend network (not shown) of the wireless communication system and may provide communication between the mobile stations 120-140 and the backend network. Of course, the wireless communication system 100 may include a plurality of base stations arranged in cells, and only one base station 110 is shown in FIG. 1 for simplicity and illustration purposes.

The wireless communication system 100 may support multiple standards and multiple band communication. For example, the wireless communication system may support LTE, WCDMA, and MC-GSM standard communication as illustrated with LTE mobile station 120, WCDMA mobile station 130, and MC-GSM mobile station 140 in FIG. 1; however, the use of these listed standards is merely exemplary and other standards also may be supported by the wireless communication system 100. In addition to multiple standard capabilities, the wireless communication system 100 may also support multiple communication bands. For example, the wireless communication system 100 may support DCS/PCS bands and GSM850/GSM900 bands of MC-GSM.

The multiple standard, multiple band signals in the wireless communication system 100 may be classified into two groups. A first group may refer to the signals for which direct conversion is applicable, and a second group may refer to the signals for which direct conversion is not applicable. In the FIG. 1 example, LTE and WCDMA may fall in the first group for which direct conversion is applicable in a base station, and MC-GSM may fall in the second group for which direct conversion is not applicable in a base station. Although direct conversion provides benefits such as low system cost, improved out-of-band performance, low power dissipation, and low component cost, some standard performance requirements are not feasible with direct conversion. For example, since a received RF signal is mixed directly to base band in direct conversion, harmonic distortions and images may fall in band. And while some standard performance requirements are sufficiently low for direct conversion applications such as LTE and WCDMA that require approximately 70 dB image and harmonic rejection, other systems require higher performance not feasible with direct conversion such as MC-GSM that requires 90 dB rejection. Major sources of noise may include image signals and harmonic distortions—second and third order (HD2, HD3 respectively).

The base station 110 may support wireless communication with mobile stations 120-140 of various standard technologies as well as in multiple bands. The base station 110 may transmit signals to the mobile stations 120-140 in downlink signals and receive signals from the mobile stations 120-140 in uplink signals. Hence, the base station 110 may receive LTE compliant signals from mobile station 120, WCDMA signals from mobile station 130, and MC-GSM signals from mobile station 140. The base station 110 may convert the received signals to baseband signals to demodulate and extract information from therein.

Figure 2:
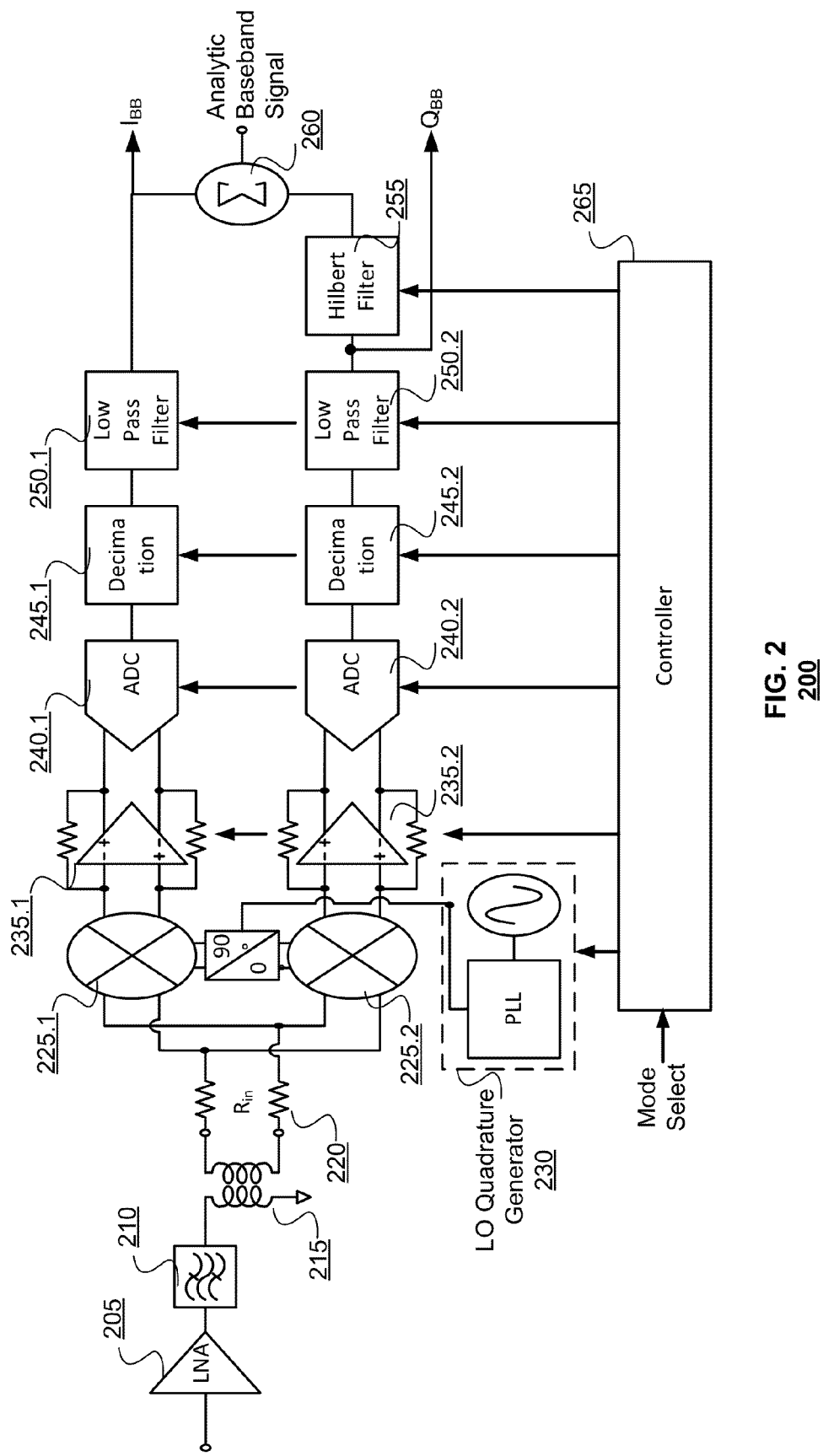
FIG. 2 illustrates a simplified block diagram of a receiver system according to an embodiment of the present invention.

FIG. 2 is a simplified block diagram of a receiver 200 according to an embodiment of the present invention. For example, the receiver 200 may be provided in the base station 110 of FIG. 1. The receiver 200 may support both aforementioned groups of signals—signals for which direct conversion is applicable (e.g., LTE, WCDMA) and signals for which direct conversion is not applicable (e.g., MC-GSM). Accordingly, the receiver 200 may be set to provide direct conversion for the first group of signals or to provide low IF conversion for the second group of signals (and first group) using common circuit components as a single monolithic receiver.

The receiver 200 may be provided on a monolithically integrated circuit. The base station receiver 200 may include a low noise amplifier (LNA) 205, a harmonic or band-pass filter 210, a transformer 215, input resistors Rin, 220, a pair of quadrature mixers 225.1-225.2, a pair of current-to-voltage amplifiers 235.1-235.2, a pair of analog-to-digital converters (ADCs) 240.1-240.2, a pair of decimation filters 245.1-245.2, a pair of low pass filters 250.1-250.2, a Hilbert filter 255, a summer 260, and a controller 265.

An input of the LNA 205 may be coupled to an antenna port, which, in turn, may be coupled to an antenna (not shown). The antenna may receive RF signals, and the LNA 205 may amplify the received RF signals. The LNA 205 may be coupled to the harmonic filter 210 that filters received RF signals that have been amplified by the LNA 205.

The harmonic or band-pass filter 210 may be coupled to the transformer 215. The transformer 215 may be provided as a balun matching transformer. The transformer 215 may convert the received signal into a balanced signal (i.e., two signals). The balanced side of the transformer 215 may be coupled to the input resistors Rin 220. The input resistors 220 may convert the RF voltage signal to a current RF signal. The input resistors 220 may be provided as substantially linear elements to keep the RF section of the base station receiver 200 relatively distortions free.

The input resistors 220 may be coupled to the pair of quadrature mixers 225.1-225.2. Each quadrature mixer 225.1-225.2 may include two inputs and one output. A first input may receive the RF signal, which may be a current signal, from both balanced nodes of the input resistors 220. A second input of the quadrature mixers 225.1-225.2 may be coupled a local oscillator (LO) quadrature generator 230. The LO quadrature generator 230 may include phase lock loop (PLL) and an oscillator. The LO quadrature generator 230 may generate LO signals at different frequencies based on the current received signal properties and frequency band. The controller 265 may receive a mode select input that corresponds to the current received signal properties and frequency band, and may control the LO quadrature generator 230 to generate an appropriate LO signal. The controller 265 may be pre-programmed for the specific band of operation based on the mode select. The mode select input may also convey which of the above-mentioned first or second group of signals the receiver may receive and process.

For first grouped signals, the quadrature mixers 225.1-225.2 may downconvert the RF signals directly to baseband signals, which may be substantially at or near 0 Hz. On the other hand, for second grouped signals, the quadrature mixers 225.1-225.2 may downconvert the RF signals to a low IF signals. For example, the low IF signals may be substantially at or near 10 MHz. The quadrature mixer 225.1 may generate an in-phase (I) downconverted signal, and its output may be provided to an I-signal path. The quadrature mixer 225.2 may generate a quadrature phase (Q) downconverted signal, and its output may be provided to a Q-signal path, which may be substantially 90 degrees out of phase with the I-signal path.

The outputs of the quadrature mixers 225.1-225.2 may be coupled to the current-to-voltage amplifiers 235.1-235.2, which may amplify and convert the downconverted signals to voltage signals. The current-to-voltage amplifiers 235.1-235.2 bandwidth may be tunable by the controller 265 to accommodate both the downconverted baseband signals belonging to the first group or, alternatively, the downconverted IF signals belonging to the second group. The controller 265 may adjust the bandwidth of the current-to-voltage amplifiers 235.1-235.2 based on the mode select.

The configuration of input resistors Rin 220, passive quadrature mixers 225.1-225.2 and the low input impedance of current-to-voltage amplifiers 235.1-235.2 may provide a highly linear RF signal path that keeps the RF section of the base station receiver 200 relatively free of distortion. The input of the current-to-voltage amplifiers 235.1-235.2 may provide a low impedance to the outputs of quadrature mixers 225.1-225.2. The low impedance of the current-to-voltage amplifiers 235.1-235.2 may be transferred to the input of quadrature mixers 225.1-225.2 when the quadrature mixers are implemented as passive switches. The low impedance at the RF and baseband signal terminals of quadrature mixers 225.1-225.2 insures that the voltage signal will be small across the passive mixer terminals. The limited voltage signal swing across the passive mixer terminals results in a high linearity mode of operation from RF to the input of the current-to-voltage amplifiers.

The current-to-voltage amplifiers 235.1-235.2 may be coupled to the ADCs 240.1-240.2. The ADCs 240.1-240.2 may digitize the downconverted signals. The ADCs 240.1-240.2 may accommodate both the downconverted baseband signals belonging to the first group or, alternatively, the downconverted IF signals belonging to the second group. The controller 265 may adjust the bandwidth of the ADCs 240.1-240.2 based on the mode select.

The ADCs 240.1-240.2 may be coupled to the decimation filters 245.1-245.2. The decimation filters 245.1-245.2 may perform downsampling. The decimation filters 245.1-245.2 may accommodate both the downconverted baseband signals belonging to the first group or, alternatively, the downconverted IF signals belonging to the second group. The controller 265 may adjust the bandwidth of the decimation filters 245.1-245.2 based on the mode select.

The decimation filters 245.1-245.2 may be coupled to the low pass filters 250.1-250.2. The low pass filters 250.1-250.2 may perform low pass filtering. The low pass filters 250.1-250.2 may accommodate both the downconverted baseband signals belonging to the first group or, alternatively, the downconverted IF signals belonging to the second group. The controller 265 may adjust the bandwidth of the low pass filters 250.1-250.2 based on the mode select.

Moreover, the decimation filters 245.1-245.2 and low pass filters 250.1-250.2 may be tunable to suppress undesired signal characteristics.

The Hilbert filter 255 may be coupled to low pass filter 250.2 in the Q-signal path. The Hilbert filter 255 may shift the Q-signal by 90 degrees and perform a fourier transform. Outputs of the I-signal path low pass filter 250.1 and the Hilbert filter 255 may be coupled to the summer 260. The summer 260 may output an analytic baseband signal from which information may be extracted. The summer 260 output may be coupled to a baseband processor, which may extract the information. For direct conversion operations, the Hilbert filer 255 may be bypassed, and the in-phase and quadrature baseband signals may be output from low pass filters 250.1, 250.2.

The receiver 200 may receive and downconvert signals employing different downconversion techniques—direct downconversion and low IF downconversion—based the mode selection. And the base station receiver 200 may be provided on a monolithically integrated circuit to support multiple previously incompatible standard technologies using the same receiver components for the different downconversion techniques. Further, digital signal processing of the low IF conversion may cancel relevant HD3 components in addition to suppressing HD2 components to acceptable levels for standard requirements such as for MC-GSM. Therefore, the receiver 200 provides an improved receiver architecture that is cost effective for its reuse of circuit components for different downconversion accommodation in a monolithically integrated circuit while providing improved communication quality.

Figure 3:
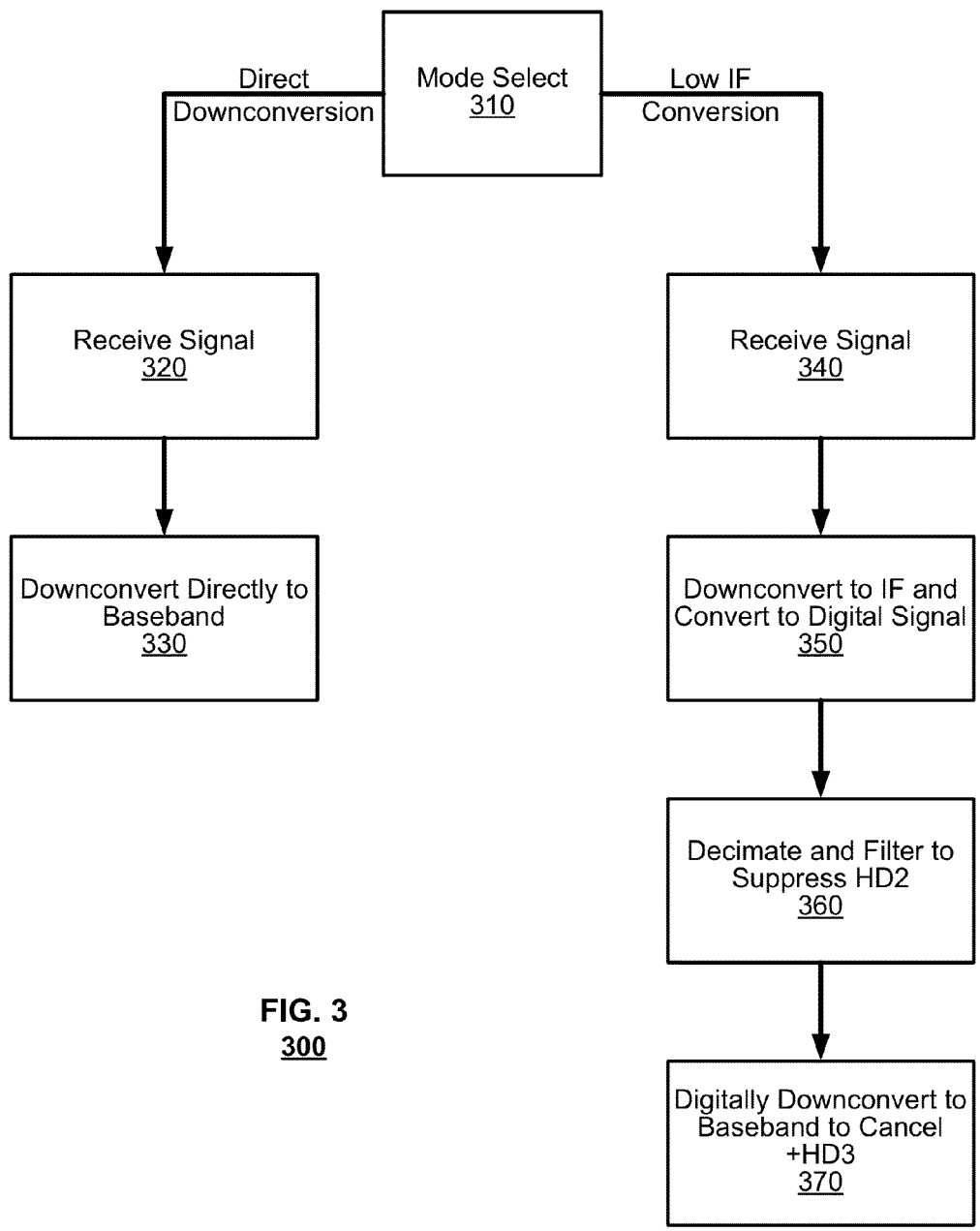
FIG. 3 illustrates a simplified process flow of receiver operations according to an embodiment of the present invention.

FIG. 3 illustrates a process 300 to receive multi-standard wireless signals using a common receiver according to an embodiment of the present invention. For example, the process 300 may be performed by the receiver 200 of FIG. 2. In step 310, a mode may be selected. The mode may correspond to whether the receiver will operate in direct downconversion or low IF downconversion mode. For example, an operator may set the mode at the time of installation. Based on the mode, the controller 265 may set the band of operation for the LO Quadrature generator 230 and other receiver components.

If direct downconversion mode is selected, a signal may be received in step 320. The received signal may be propagated through a common RF section. For example, the receive signal may be amplified, harmonically filtered, and converted to a balanced RF signal using common RF circuit components such as a common LNA 205, harmonic filter 210, and transformer 220 as shown of FIG. 2. Further, the received signal, which may be a voltage signal, may be converted to a current signal.

In step 330, the received signal may be downconverted directly to baseband. The downconversion may be performed by a quadrature mixer that downconverts the received signal to substantially at or near 0 Hz (i.e., baseband). The baseband signal may be converted back to a voltage signal and then digitized. The baseband signal may be further processed for image rejection and harmonic distortions suppression. Because of the direct downconversion to baseband, HD2 and HD3 may fall in band and may have to be suppressed accordingly. The suppression may be performed via analog filtering, digital filtering, and/or decimation. In an embodiment, the image and harmonic distortion may be suppressed to 70 dB or below. In direct conversion, the digital signal may bypass the Hilbert filter 255 of receiver 200 in FIG. 2, and the baseband signals ($I_{BB}$ and $Q_{BB}$) may be output from the low pass filters 250.1, 250.2. In an embodiment, direct downconversion mode may be well suited for LTE and WCDMA signals.

If low IF conversion mode is selected, a signal may be received in step 320. The received signal may be propagated through a common RF section. For example, the receive signal may be amplified, harmonically filtered, and converted to a balanced RF signal using common RF circuit components such as a common LNA 205, harmonic filter 210, and transformer 215 as shown of FIG. 2. Further, the received signal, which may be a voltage signal, may be converted to a current signal.

In step 350, the received signal may be downconverted to a low IF signal. In an embodiment, low IF conversion mode mode may be well suited for MC-GSM signals; however, it may be also be used for LTE and WCDMA signals. The downconversion may be performed by a quadrature mixer that downconverts the RF signal to the low IF signal, which may be substantially at or near 10 MHz. For example, the same quadrature mixer may be configurable to directly downconvert the LTE and WCDMA signals to baseband as well as to downconvert the MC-GSM signals to low IF, based on the mode select. The low IF signal may be converted back to a voltage signal and then digitized.

The low IF signal may be further processed for image rejection and harmonic distortions suppression. In step 345, the low IF signal may be decimated (i.e., downsampled) and filtered dynamically to suppress HD2 components. For example, an analytic baseband signal may be generated by summing the "I" path and "Q" path, which includes the Hilbert filter 255, by summer 260. In an embodiment, if the RF signal is a 2-tone signal, the quadrature low-IF (baseband) signal may be expressed as:

$$I_{BB}(t) = A\cos(\Omega_1 t) + A\cos(\Omega_2 t)$$

$$Q_{BB}(t) = A\sin(\Omega_1 t) + A\sin(\Omega_2 t)$$

where A is the amplitude (i.e., magnitude), and w1 and w2 represent the carrier frequency.

These signals may be squared to correct even-order non-linearity, which may be expressed as:

$$\begin{aligned}I_{BB}^2(t) &= A^2[\cos(\omega_1 t) + \cos(\omega_2 t)]^2 \\ &= \frac{A^2}{2}\{2 + \cos(2\omega_1 t) + \cos(2\omega_2 t) + \\ &\quad 2\cos[(\omega_2 - \omega_1)t] + 2\cos[(\omega_1 + \omega_2)t]\}\end{aligned}$$

$$\begin{aligned}jQ_{BB}^2(t) &= jA^2[\sin(\omega_1 t) + \sin(\omega_2 t)]^2 \\ &= j\frac{A^2}{2}\{2 - \cos(2\omega_1 t) - \cos(2\omega_2 t) + 2\cos[(\omega_2 - \omega_1)t] - \\ &\quad 2\cos[(\omega_1 + \omega_2)t]\}\end{aligned}$$

The squared signals may be summed to generate a complex baseband signal, which may be expressed as:

$$\begin{aligned}&I_{BB}^2(t) + jQ_{BB}^2(t) = \\ &\frac{A^2}{2}\{2 + \cos(2\omega_1 t) + \cos(2\omega_2 t) + 2\cos[(\omega_2 - \omega_1)t] + 2\cos[(\omega_1 + \omega_2)t]\} + \\ &j\frac{A^2}{2}\{2 - \cos(2\omega_1 t) - \cos(2\omega_2 t) + 2\cos[(\omega_2 - \omega_1)t] - 2\cos[(\omega_1 + \omega_2)t]\}\end{aligned}$$

Note that while HD2 components appear on both sidebands, the HD2 components are substantially (~6 dB) lower than IM2 components.

Also, the low IF signal may be digitally downconverted to baseband using a harmonic filter. During this signal processing, positive HD3 (+HD3) may be cancelled. Consider the same input signal discussed above that may be cubed to correct third-order non-linearity, which may be expressed as:

$$I_{BB}^3(t) = A^3[\cos(\omega_1 t) + \cos(\omega_2 t)]^3 =$$

$$A^3 \left\{ \begin{array}{l} \frac{9}{4}[\cos(\omega_1 t) + \cos(\omega_2 t)] + \frac{1}{4}[\cos(3\omega_1 t) + \cos(3\omega_2 t)] + \frac{3}{4} \\ \{\cos[(2\omega_2 - \omega_1)t] + \cos[(2\omega_1 - \omega_2)t] + \\ \cos[(2\omega_2 + \omega_1)t] + \cos[(2\omega_1 + \omega_2)t]\} \end{array} \right\}$$

$$jQ_{BB}^3(t) = jA^3[\sin(\omega_1 t) + \sin(\omega_2 t)]^3 =$$

$$A^3 \left\{ \begin{array}{l} \frac{9}{4}[\cos(\omega_1 t) + \cos(\omega_2 t)] - \frac{1}{4}[\cos(3\omega_1 t) + \cos(3\omega_2 t)] + \frac{3}{4} \\ \{\cos[(2\omega_2 - \omega_1)t] + \cos[(2\omega_1 - \omega_2)t] - \\ \cos[(2\omega_2 + \omega_1)t] - \cos[(2\omega_1 + \omega_2)t]\} \end{array} \right\}$$

The cubed signals may be summed to generate a complex baseband signal, which may be expressed as:

$$I_{BB}^3(t) + jQ_{BB}^3(t) =$$

$$A^3 \left\{ \begin{array}{l} \frac{9}{4}[e^{j\omega_1 t} + e^{j\omega_2 t}] + \frac{1}{4}[e^{-j3\omega_1 t} + e^{-j3\omega_2 t}] + \\ \frac{3}{4}\{e^{j(2\omega_2-\omega_1)t} + e^{j(2\omega_1-\omega_2)t} + e^{-j(2\omega_2+\omega_1)t} + e^{-j(2\omega_1+\omega_2)t}\} \end{array} \right\}$$

Note that the $3^{rd}$ order term is only on the opposite (negative) side-band and has been eliminated in the positive side-band.

Figure 4:
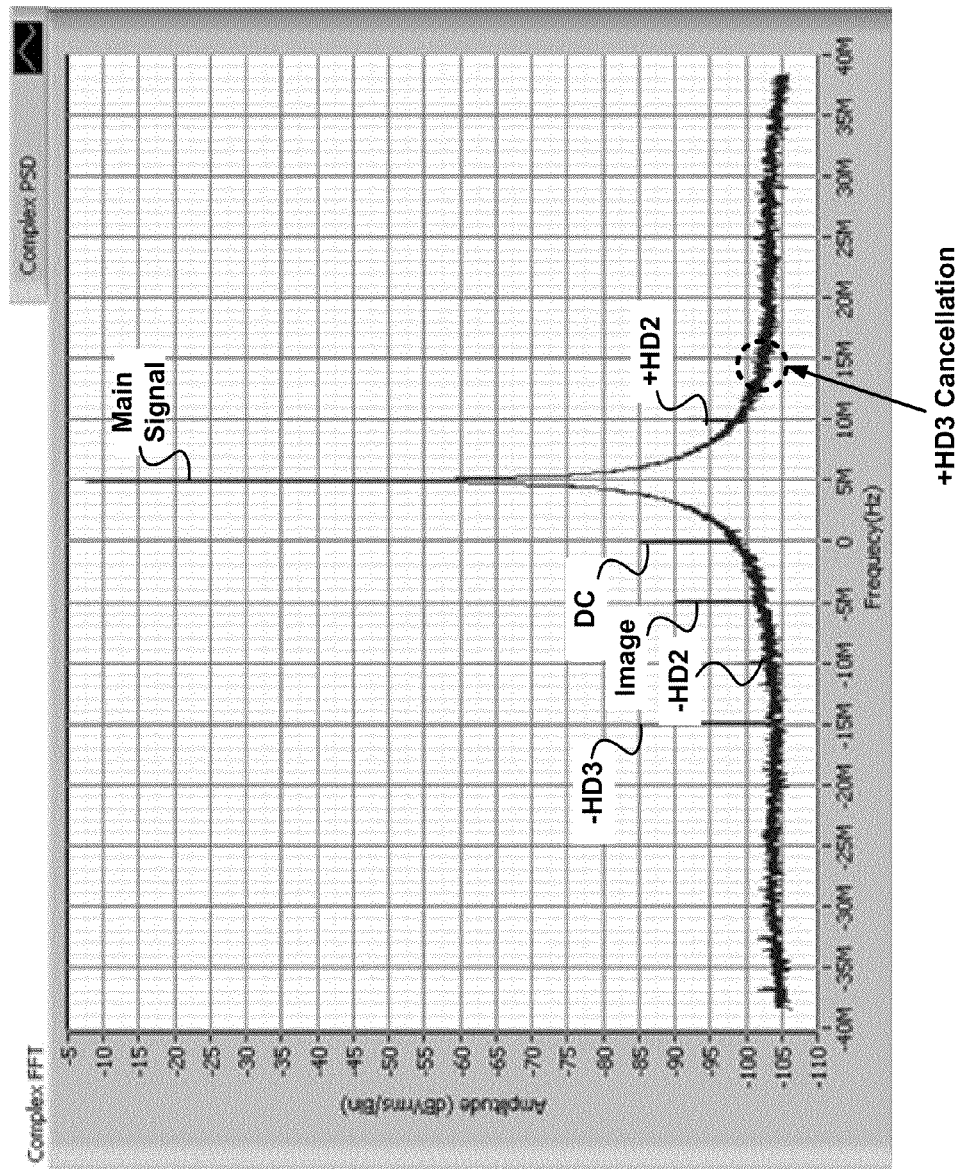
FIG. 4 illustrates signals generated by a receiver system according to an embodiment of the present invention.

FIG. 4 illustrates an exemplary simulation plot 400 of a MC-GSM signal downconverted using low-IF downconversion techniques on a monolithically integrated circuit as described herein. Here, a main signal is shown centered at or near 5 Mhz. +HD2 is shown to be sufficiently suppressed to approximately −95 dB, which is under the MC-GSM acceptable amount. Note that +HD3 is substantially cancelled as it would appear at or near 15 MHz.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A receiver, comprising:
an RF section;
a quadrature mixture, coupled to the RF section, to downconvert a first group of wireless signals directly to baseband frequency quadrature signals and to downconvert a second group of wireless signals to intermediate frequency quadrature signals;
a pair of analog-to-digital converters (ADCs) to convert the downconverted quadrature signals to corresponding digital quadrature signals; and
a digital section having two paths to perform signal processing on the digital baseband frequency quadrature signals and to downconvert the digital intermediate frequency signals to baseband cancelling a third order harmonic distortion therein,
wherein the receiver is provided on a monolithically integrated circuit,
wherein the digital section includes a harmonic suppression device in one of the two digital section's path, which is used for the second group of wireless signals but is bypassed for the first group of wireless signals.

2. The receiver of claim 1, wherein the first group includes LTE and/or WCDMA signals.

3. The receiver of claim 1, wherein the second group includes MC-GSM signals.

4. The receiver of claim 1, wherein the harmonic suppression device includes a Hilbert filter.

5. The receiver of claim 1, wherein the digital section includes a decimation and low pass filter in each path.

6. The receiver of claim 1, wherein the RF section includes a low noise amplifier to receive the first and second group of wireless signals.

7. The receiver of claim 1, further comprising a variable local oscillator generator to generate a local oscillation signal.

8. The receiver of claim 1, wherein the harmonic suppression device includes
a Hilbert transform filter in only one of the two digital section's path to suppress the third order harmonic distortion, and
a summer to combine the output of the Hilbert transform filter and an output of the other digital section path,
wherein the Hilbert transform filter and summer are used for the second group of wireless signals and are bypassed for the first group of wireless signals.

9. A method of operating a monolithically integrated receiver comprising,
based on a mode selection, operating the monolithically integrated receiver either in a direct conversion mode or a low intermediate frequency (IF) conversion mode;
if in direct conversion mode, receiving an RF signal and downconverting the RF signal to a baseband signal using a quadrature mixture; and
if in low IF conversion mode, receiving an RF signal and downconverting the RF signal to an IF signal using the quadrature mixture,
decimating and filtering the IF signal, and
digitally downconverting the IF signal to baseband to cancel a third order harmonic distortion component associated with the IF signal using a harmonic suppression device in low IF conversion mode and bypassing the harmonic suppression device in direct conversion mode.

10. The method of claim 9, wherein direct conversion mode is for a first group of signals and the first group includes LTE and/or WCDMA signals.

11. The method of claim 9, wherein low IF conversion mode is for a second group of signals and the second group includes MC-GSM signals.

12. The method of claim 9, further comprises converting the RF signal into a current signal and converting the current signal back into a voltage signal after the downconversion.

13. The method of claim 9, wherein the harmonic suppression device includes a Hilbert filter.

14. The method of claim 9, wherein the a harmonic suppression device includes a Hilbert transform, the method further comprising:
in low IF conversion mode:
applying the Hilbert transform to one quadrature signal of the downconverted IF signal using a Hilbert transform filter and not applying the Hilbert transform to the other quadrature signal of the downconverted IF signal, and
combining Hilbert transformed quadrature signal and the other quadrature signal of the downconverted IF signal; and
in direct conversion mode, bypassing the Hilbert transform filter.

15. A base station, comprising:
an antenna; and
a monolithically integrated receiver, comprising
an RF section coupled to the antenna, a quadrature mixture to convert RF signals to either a baseband signal or an intermediate frequency based on a mode select, and a digital section having two paths to perform signal processing to downconvert intermediate frequency signals to baseband cancelling a third order harmonic distortion therein, wherein the digital section includes a harmonic suppression device in one of the two digital section's path, which is used in one mode to cancel the third order harmonic distortion but is bypassed in another mode.

16. The base station of claim 15, wherein the harmonic suppression device includes a Hilbert filter.

17. The base station of claim 15, wherein the digital section includes a decimation and low pass filter in each path.

18. The base station of claim 15, wherein the RF section includes a low noise amplifier.

19. The base station of claim 15, further comprising a variable local oscillator generator to generate a local oscillation signal based on the mode select.

20. The base station of claim 15, wherein the harmonic suppression device includes
   a Hilbert transform filter in only one of the two digital section's path to suppress the third order harmonic distortion, and
   a summer to combine the output of the Hilbert transform filter and an output of the other digital section path.

* * * * *